United States Patent
Sahil et al.

(10) Patent No.: US 12,314,139 B2
(45) Date of Patent: May 27, 2025

(54) INLINE HOUSEKEEPING FOR A DEDUPLICATION STORAGE SYSTEM

(71) Applicant: HEWLETT PACKARD ENTERPRISE DEVELOPMENT LP, Spring, TX (US)

(72) Inventors: Aman Sahil, Bristol (GB); Callum Murray, Bristol (GB); Richard Phillip Mayo, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/307,960

(22) Filed: Apr. 27, 2023

(65) Prior Publication Data

US 2024/0362122 A1 Oct. 31, 2024

(51) Int. Cl.
*G06F 11/14* (2006.01)

(52) U.S. Cl.
CPC ...... *G06F 11/1453* (2013.01); *G06F 11/1461* (2013.01); *G06F 2201/84* (2013.01)

(58) Field of Classification Search
CPC ............. G06F 11/1453; G06F 11/1461; G06F 2201/84
USPC ......................................................... 707/654
See application file for complete search history.

(56) References Cited

U.S. PATENT DOCUMENTS

| | | | |
|---|---|---|---|
| 5,950,218 A | 9/1999 | Howard | |
| 7,689,560 B2 | 3/2010 | Barabas et al. | |
| 9,061,843 B2 | 6/2015 | Torson et al. | |
| 10,228,854 B2 | 3/2019 | Romanovsky et al. | |
| 10,310,946 B2 | 6/2019 | Thomsen | |
| 10,360,111 B2 | 7/2019 | Thomsen | |
| 10,365,974 B2 | 7/2019 | Todd et al. | |
| 11,550,493 B2* | 1/2023 | Falkinder | G06F 3/0679 |
| 12,019,620 B2 | 6/2024 | Mayo et al. | |
| 12,061,581 B2 | 8/2024 | Sahil et al. | |
| 2009/0172014 A1 | 7/2009 | Huetter | |
| 2013/0268497 A1* | 10/2013 | Baldwin | G06F 3/0683 |
| | | | 707/E17.002 |
| 2017/0308305 A1* | 10/2017 | Goel | G06F 3/0641 |
| 2020/0110537 A1 | 4/2020 | Hahn et al. | |
| 2020/0320040 A1 | 10/2020 | Butt | |
| 2023/0062644 A1* | 3/2023 | Qiu | G06F 16/1752 |
| 2024/0028465 A1* | 1/2024 | Murray | G06F 11/1453 |
| 2024/0037034 A1 | 2/2024 | Falkinder et al. | |
| 2024/0311361 A1 | 9/2024 | Mayo | |
| 2024/0311363 A1 | 9/2024 | Murray et al. | |

\* cited by examiner

*Primary Examiner* — Cam Linh T Nguyen
(74) *Attorney, Agent, or Firm* — Trop, Pruner & Hu, P.C.

(57) ABSTRACT

Example implementations relate to deduplication operations in a storage system. An example includes receiving a stream of data units to be stored in a persistent storage of a deduplication storage system; loading a first container index into the memory to index one or more data units included in the stream; updating the first container index to indicate a storage location of a first data unit included in the stream; reading a manifest list in the first container index to identify a first manifest indexed by the first container index; and, while the first container index remains loaded in the memory to index the one or more data units, in response to a determination that the identified first manifest is included in the first backup item that has been marked for deletion, decrementing a reference count of a second data unit.

20 Claims, 13 Drawing Sheets

INLINE HOUSEKEEPING FOR A DEDUPLICATION STORAGE SYSTEM

BACKGROUND

Data reduction techniques can be applied to reduce the amount of data stored in a storage system. An example data reduction technique includes data deduplication. Data deduplication identifies data units that are duplicative, and seeks to reduce or eliminate the number of instances of duplicative data units that are stored in the storage system.

BRIEF DESCRIPTION OF THE DRAWINGS

Some implementations are described with respect to the following figures.

Figure 1:
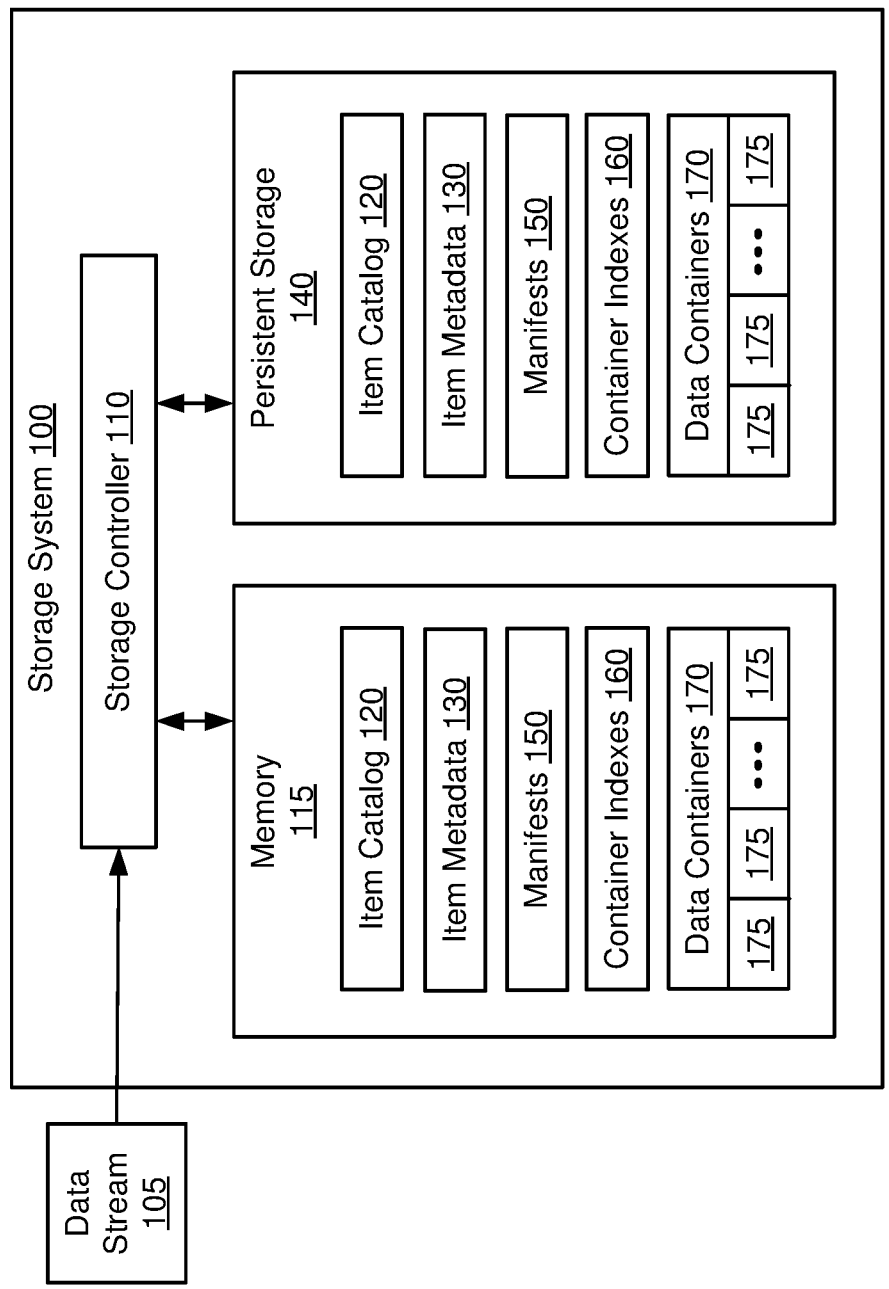
FIG. 1 is a schematic diagram of an example storage system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a storage system may back up a collection of data (referred to herein as a "stream" of data or a "data stream") in deduplicated form, thereby reducing the amount of storage space required to store the data stream. The storage system may create a "backup item" to represent a data stream in a deduplicated form. The storage system may perform a deduplication process including breaking a stream of data into discrete data units (or "chunks") and determining "fingerprints" (described below) for these incoming data units. Further, the storage system may compare the fingerprints of incoming data units to fingerprints of stored data units, and may thereby determine which incoming data units are duplicates of previously stored data units (e.g., when the comparison indicates matching fingerprints). In the case of data units that are duplicates, the storage system may store references to previously stored data units instead of storing the duplicate incoming data units. A process for receiving and deduplicating an inbound data stream may be referred to herein as a "data ingest" process of a storage system.

As used herein, the term "fingerprint" refers to a value derived by applying a function on the content of the data unit (where the "content" can include the entirety or a subset of the content of the data unit). An example of a function that can be applied includes a hash function that produces a hash value based on the content of an incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

A "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof. A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a deduplication storage system may use metadata for processing inbound data streams (e.g., backup items). For example, such metadata may include data recipes (also referred to herein as "manifests") that specify the order in which particular data units are received for each backup item. Further, such metadata may include item metadata to represent each received backup item (e.g., a data stream) in a deduplicated form. The item metadata may include identifiers for a set of manifests, and may indicate the sequential order of the set of manifests. The processing of each backup item may be referred to herein as a "backup process." Subsequently, in response to a read request, the deduplication system may use the item metadata and the set of manifests to determine the received order of data units, and may thereby recreate the original data stream of the backup item. Accordingly, the set of manifests may be a representation of the original backup item. The manifests may include a sequence of records, with each record representing a particular set of data unit(s). The records of the manifest may include one or more fields that identify container indexes that index (e.g., include storage information for) the data units. For example, a container index may include one or more fields that specify location information (e.g., containers, offsets, etc.) for the stored data units, compression and/or encryption characteristics of the stored data units, and so forth. Further, the container index may include reference counts that indicate the number of manifests that reference each data unit.

In some examples, upon receiving a data unit (e.g., in a data stream), it may be matched against one or more container indexes to determine whether an identical chunk is already stored in a container of the deduplication storage system. For example, the deduplication storage system may compare the fingerprint of the received data unit against the fingerprints in one or more container indexes. If no matching fingerprints are found in the searched container index(es), the received data unit may be added to a container, and an entry for the received data unit may be added to a container index corresponding to that container. However, if a matching fingerprint is found in a searched container index, it may be determined that a data unit identical to the received data unit is already stored in a container. In response to this determination, the reference count of the corresponding entry is incremented, and the received data unit is not stored in a container (as it is already present in one of the containers), thereby avoiding storing a duplicate data unit in the deduplication storage system. As used herein, the term "matching operation" may refer to an operation to compare fingerprints of a collection of multiple data units (e.g., from a particular backup data stream) against fingerprints stored in a container index.

In some examples, the deduplication storage system may perform housekeeping tasks to maintain the accuracy of the included metadata. For example, when a data unit is deleted from a given manifest (e.g., due to a change to the data stream or item represented by the manifest), a housekeeping task may include decrementing the reference count for that data unit by one (i.e., indicating that the data unit is referenced by one less manifest). In some examples, when a particular backup item is marked for deletion (e.g., is identified as no longer needed) in the deduplication storage system, a set of housekeeping tasks (referred to as a "housekeeping job") may be scheduled and performed to delete that backup item. The housekeeping job may include identifying the manifests included in the backup item, sequentially accessing and loading these manifests into memory, and reading the manifests to determine the container identifiers and address information for the data units in each manifest. The housekeeping job may also include accessing and loading the container indexes (e.g., using the container identifiers) into memory, decrementing the reference counts for the data units (e.g., using the address information for the data units), and then saving the container indexes to persistent storage. Accordingly, performing such housekeeping jobs may involve a relatively large number of input/output (I/O) operations to load multiple metadata items (e.g., manifests and container indexes) from persistent storage to memory, and to write at least some of the multiple metadata items from memory to persistent storage. Accordingly, performing such housekeeping jobs may reduce the performance of the deduplication storage system.

In accordance with some implementations of the present disclosure, a controller of a deduplication storage system may perform at least some housekeeping tasks during data ingest operations (also referred to herein as an "inline housekeeping"). For example, when a container index is loaded into memory during a data ingest operation, the controller may access a data structure in the container index to identify one or more manifests that are indexed by the container index. The controller may identify each backup item that includes at least one of the manifests indexed by the container index, and may determine whether the backup item has been marked for deletion. If so, the controller may perform an inline housekeeping operation to decrement the reference counts in the container index that represent data units included in the marked backup item. Accordingly, because the inline housekeeping operation for the marked backup item is performed while the container index is already loaded in memory (e.g., for the data ingest process), there is no need for a separate I/O operation to load the container index into memory to perform housekeeping for the marked backup item. In this manner, some implementations may reduce the amount of I/O bandwidth used for housekeeping jobs, and may thereby improve the performance of the storage system. Various aspects of the disclosed housekeeping process are discussed further below with reference to FIGS. 1-8.

FIG. 1—Example Storage System

FIG. 1 shows an example of a storage system 100 that includes a storage controller 110, memory 115, and persistent storage 140, in accordance with some implementations. The persistent storage 140 may include one or more non-transitory storage media such as hard disk drives (HDDs), solid state drives (SSDs), optical disks, and so forth, or a combination thereof. The memory 115 may be implemented in semiconductor memory such as random access memory (RAM). In some examples, the storage controller 110 may be implemented via hardware (e.g., electronic circuitry) or a combination of hardware and programming (e.g., comprising at least one processor and instructions executable by the at least one processor and stored on at least one machine-readable storage medium).

As shown in FIG. 1, the memory 115 and the persistent storage 140 may store various data structures including at least an item catalog 120, item metadata 130, manifests 150, container indexes 160, and data containers 170. In some examples, copies of the manifests 150, container indexes 160, and the data containers 170 may be transferred between the memory 115 and persistent storage 140 (e.g., via read and write input/output (I/O) operations).

In some implementations, the storage system 100 may perform a data ingest operation to deduplicate received data. For example, the storage controller 110 may receive an inbound data stream 105 (also referred to herein as a "backup item") including multiple data units, and may store at least one copy of each data unit in a data container 170 (e.g., by appending the data units to the end of the data container 170). In some examples, each data container 170 may be divided into entities 175, where each entity 175 includes multiple stored data units.

In one or more implementations, the storage controller 110 may generate a fingerprint for each received data unit. For example, the fingerprint may include a full or partial hash value based on the data unit. To determine whether an incoming data unit is a duplicate of a stored data unit, the storage controller 110 may perform a matching operation to compare the fingerprint generated for the incoming data unit to the fingerprints in at least one container index 160. If a match is identified, then the storage controller 110 may determine that a duplicate of the incoming data unit is already stored by the storage system 100. The storage controller 110 may then store references to the previous data unit, instead of storing the duplicate incoming data unit.

In some implementations, the storage controller 110 may generate item metadata 130 to represent each received backup item (e.g., a data stream 105) in a deduplicated form. Each item metadata 130 may include identifiers for a set of manifests 150, and may indicate the sequential order of the set of manifests 150. The manifests 150 record the order in which the data units were received. Further, the manifests 150 may include a pointer or other information indicating the container index 160 that indexes each data unit. In some implementations, the container index 160 may indicate the location in which the data unit is stored. For example, the container index 160 may include information specifying that the data unit is stored at a particular offset in an entity, and that the entity is stored at a particular offset in a data container 170. Further, the container index 160 may include reference counts that indicate the number of manifests 150 that reference each data unit.

In some implementations, the storage controller 110 may receive a read request to access the stored data, and in response may access the item metadata 130 and manifests 150 to determine the sequence of data units that made up the original data. The storage controller 110 may then use pointer data included in a manifest 150 to identify the container indexes 160 that index the data units. Further, the storage controller 110 may use information included in the identified container indexes 160 (and information included in the manifest 150) to determine the locations that store the data units (e.g., data container 170, entity 175, offsets, etc.), and may then read the data units from the determined locations.

In some implementations, the item catalog 120 may be a data structure to list the backup items stored in the storage system 100 (e.g., the backup items represented by the item metadata 130) and the current state or status of each backup item (e.g., active, retired, and so forth). For example, the storage controller 110 may receive a request to delete a particular backup item, and in response may update the item catalog 120 to indicate that the backup item has a "retired" status (e.g., is pending deletion via a housekeeping process).

In some implementations, performing a matching operation (e.g., during data ingest) may include transferring a copy of a container index 160 from the persistent storage 140 to the memory 115 (e.g., via a read I/O operation). Upon completion of this transfer, the storage controller 110 may access a data structure in the container index 160 to identify a set of manifests 150 that are indexed by the container index 160. Further, the storage controller 110 may use the item catalog 120 to determine whether any the identified manifests are included in a backup item that has been marked for deletion (e.g., is listed with a retired status in the item catalog 120). For example, a portion of each manifest identifier may be the item identifier of the backup item that includes that manifest 150. As such, the manifest identifier may be matched (via the item identifier) to a backup item that is marked for deletion in the item catalog 120. Further, upon identifying a manifest 150 that is indexed by the container index 160 and is also included in a backup item that has been marked for deletion, the storage controller 110 may perform an inline housekeeping process to decrement the reference counts in the container index 160 that represent data units included in the backup item. Accordingly, because the inline housekeeping for the marked backup item is performed while the container index 160 remains loaded in the memory 115 (e.g., for the data ingest process), there is no need to perform a separate I/O operation to load the container index 160 into the memory 115 to perform housekeeping for the backup item. In this manner, some implementations may reduce the amount of I/O bandwidth used for housekeeping jobs, and may thereby improve the performance of the storage system 100. Example processes for performing inline housekeeping are discussed further below with reference to FIGS. 3A-3D.

Figure 2:
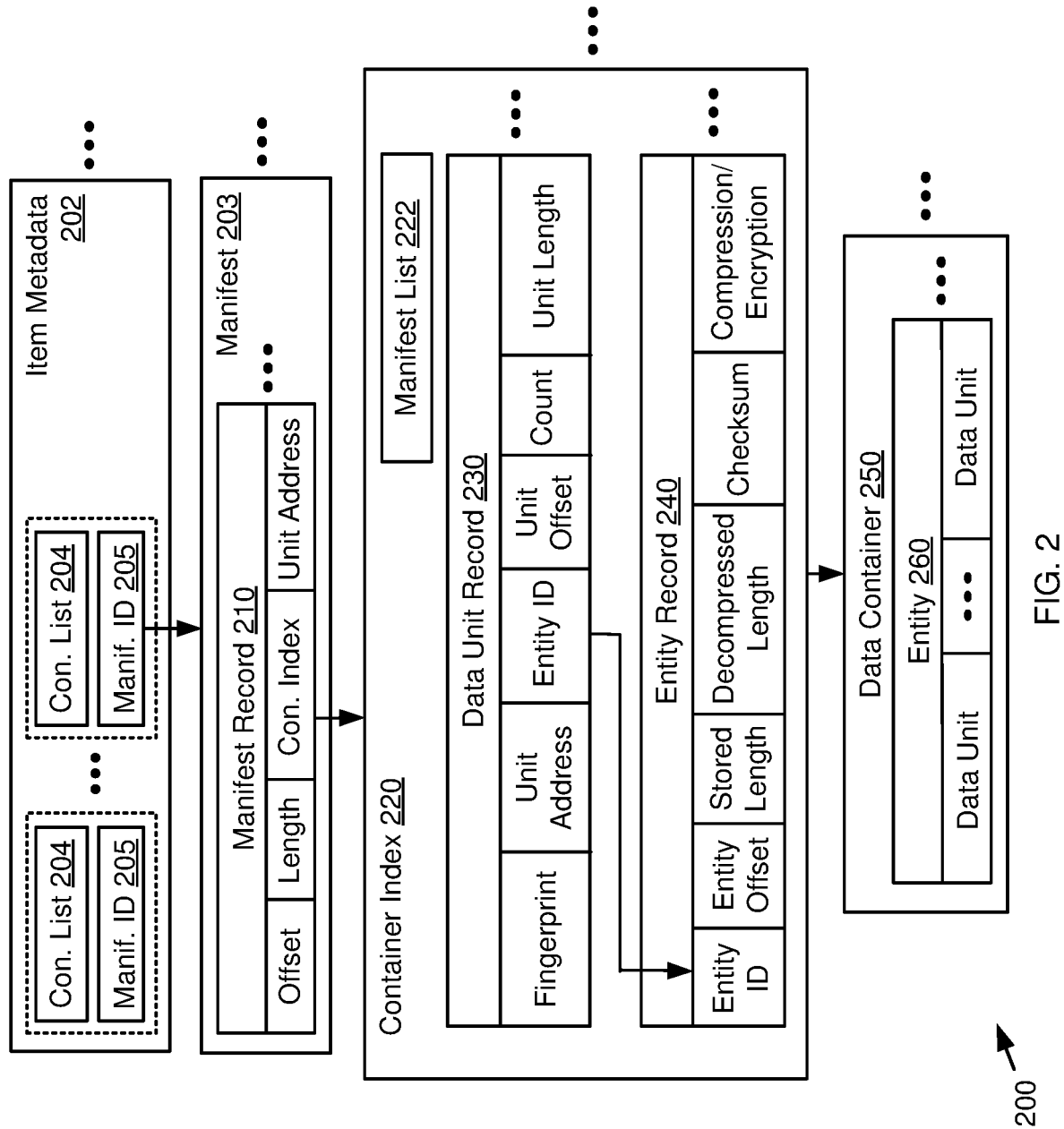
FIG. 2 is an illustration of example data structures, in accordance with some implementations.

FIG. 2—Example Data Structures

Referring now to FIG. 2, shown is an illustration of example data structures 200 used in deduplication, in accordance with some implementations. As shown, the data structures 200 may include item metadata 202, a manifest 203, a container index 220, and a data container 250. In some examples, the item metadata 202, the manifest 203, the container index 220, and the data container 250 may correspond generally to example implementations of item metadata 130, a manifest 150, a container index 160, and a data container 170 (shown in FIG. 1), respectively. In some examples, the data structures 200 may be generated and/or managed by the storage controller 110 (shown in FIG. 1).

In some implementations, the item metadata 202 may include multiple manifests identifiers 205. Each manifests identifier 205 may identify a different manifest 203. In some implementations, the manifests identifiers 205 may be arranged in a stream order (i.e., based on the order of receipt of the data units represented by the identified manifests 203). Further, the item metadata 202 may include a container list 204 associated with each manifest identifier 205. In some implementations, the container list 204 may include identifiers for a set of container indexes 220 that index the data units included in the associated manifest 203 (i.e., the manifest 203 identified by the associated manifest identifier 205).

Although one of each is shown for simplicity of illustration in FIG. 2, data structures 200 may include a plurality of instances of item metadata 202, each including or pointing to one or more manifests 203. In such examples, data structures 200 may include a plurality of manifests 203. The manifests 203 may reference a plurality of container indexes 220, each corresponding to one of a plurality of data containers 250. Each container index 220 may comprise one or a plurality of data unit records 230, and one or a plurality of entity records 240.

As shown in FIG. 2, in some examples, each manifest 203 may include one or more manifest records 210. Each manifest record 210 may include various fields, such as offset, length, container index, and unit address. In some implementations, each container index 220 may include any number of data unit record(s) 230 and entity record(s) 240. Each data unit record 230 may include various fields, such as a fingerprint (e.g., a hash of the data unit), a unit address, an entity identifier, a unit offset (i.e., an offset of the data unit within the entity), a reference count value, and a unit length. In some examples, the reference count value may indicate the number of manifest records 210 that reference the data unit record 230. Further, each entity record 240 may include various fields, such as an entity identifier, an entity offset (i.e., an offset of the entity within the container), a stored length (i.e., a length of the data unit within the entity), a decompressed length, a checksum value, and compression/encryption information (e.g., type of compression, type of encryption, and so forth). In some implementations, each container 250 may include any number of entities 260, and each entity 260 may include any number of stored data units.

In some implementations, the unit address (included in the manifest record 210 and the data unit record 230) may be an identifier that deterministically identifies a particular data unit within a given container index 220. In some examples, the unit address may be a numerical value (referred to as the "arrival number") that indicates the sequential order of arrival (also referred to as the "ingest order") of data units being indexed in a given container index 220 (e.g., when receiving and deduplicating an inbound data stream). For example, the first data unit to be indexed in a container index 220 (e.g., by creating a new data unit record 230 for the first data unit) may be assigned an arrival number of "1," the second data unit may be assigned an arrival number of "2," the third data unit may be assigned an arrival number of "3," and so forth. However, other implementations are possible.

In some implementations, a manifest record 210 may use a run-length reference format to represent a continuous range of data units (e.g., a portion of a data stream) that are indexed within a single container index 220. The run-length reference may be recorded in the unit address field and the length field of the manifest record 210. For example, the unit address field may indicate the arrival number of a first data unit in the data unit range being represented, and the length field may indicate a number N (where "N" is an integer) of data units, in the data unit range, that follow the data unit specified by arrival number in the unit address field. The data units in a data unit range may have consecutive arrival numbers (e.g., because they are consecutive in an ingested data stream). As such, a data unit range may be represented by an arrival number of a first data unit in the data unit range (e.g., specified in the unit address field of a manifest record 210) and a number N of further data units in the data unit range (e.g., specified in the length field of the manifest record 210). The further data units in the data unit range after the first data unit may be deterministically derived by calculating the N arrival numbers that sequentially follow the specified arrival number of the first data unit, where those N arrival numbers identify the further data units in the data unit range. In such examples, manifest record 210 may include an arrival number "X" in the unit address field and a number N in the length field, to indicate a data unit range including the data unit specified by arrival number X and the data units specified by arrival numbers X+i for i=0 through i=N, inclusive (where "i" is an integer). In this manner, the manifest record 210 may be used to identify all data units in the data unit range.

In one or more implementations, the data structures 200 may be used to retrieve stored deduplicated data. For example, a read request may specify an offset and length of data in a given file. These request parameters may be matched to the offset and length fields of a particular manifest record 210. The container index and unit address of the particular manifest record 210 may then be matched to a particular data unit record 230 included in a container index 220. Further, the entity identifier of the particular data unit record 230 may be matched to the entity identifier of a particular entity record 240. Furthermore, one or more other fields of the particular entity record 240 (e.g., the entity offset, the stored length, checksum, etc.) may be used to identify the container 250 and entity 260, and the data unit may then be read from the identified container 250 and entity 260.

In some implementations, each container index 220 may include a manifest list 222. The manifest list 222 may be a data structure to store a set of entries, where each entry stores information regarding a different manifest 203 that is indexed by the container index 220. For example, in some implementations, each entry of the manifest list 222 may only store an manifest identifier 205. Further, in other examples, each entry of the manifest list 222 may include both a manifest identifier 205 and at least one data unit range (e.g., a set of one or more data units that are included in the manifest 203 and that are indexed by the container index 220). In some examples, a manifest list 222 with entries that include both manifest identifiers 205 and data unit range information may be referred to as a "back-reference list."

In some implementations, an entry of the manifest list 222 may specify a data unit range as a run-length reference that identifies a first data unit and the length of the data unit range in the container index 220. For example, the run-length reference may identify the first data unit in the data unit range using a first arrival number "X" assigned to the first data unit in the container index 220. Further, the run-length reference may identify a length value N indicating the number of arrival numbers that sequentially follow the first arrival number "X," and that are assigned in the container index 220 to the remaining data units in the data unit range. In such examples, the run-length reference included in the back-reference entry may be used to identify the first data unit in the range (having the first arrival number "X"), and then identifying the remaining data units in the range (having the N arrival numbers that consecutively follow the first arrival number "X"). In this manner, the run-length reference included in the back-reference entry may be used to deterministically identify all data units in the data unit range. Further, in other examples, the entry of the manifest list 222 may specify a data unit range (including one or more data units) using other identifiers or representations. For example, the entry may specify a data unit range as a fingerprint of a single data unit, as a set of fingerprints for multiple data units, as a set of arrival numbers for multiple data units, as an offset (e.g., a byte distance from an end), as an offset and length, or the like.

In some implementations, a storage controller (e.g., storage controller 110 shown in FIG. 1) may load a container index 220 into memory to perform a matching operation (e.g., during data ingest of a received data stream). In response to (or subsequent to) the loading of the container index 220 into memory, the storage controller may access the manifest list 222 (included in the container index 220) to identify the manifests 203 that are indexed by the container index 220. Further, the storage controller may determine whether any the identified manifests 220 are included in a backup item that has been marked for deletion (e.g., in the item catalog 120 shown in FIG. 1). If so, the storage controller may decrement the reference counts in the container index 220 (e.g., corresponding to data units included in the backup item) while the container index 220 remains loaded in memory for the matching operation. Accordingly, some implementations may reduce the amount of I/O bandwidth used for housekeeping jobs, and may thereby improve the performance of the deduplication storage system.

Figure 3A:
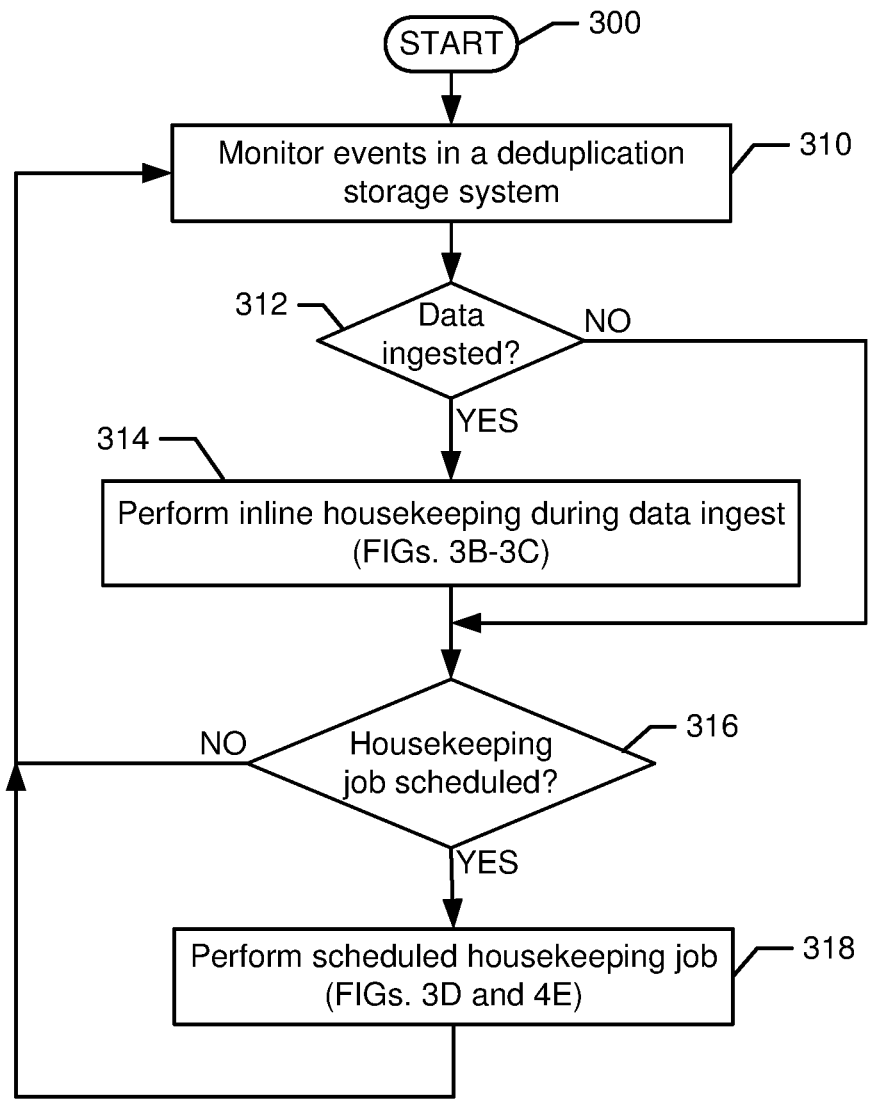
FIGS. 3A-3D are illustrations of example processes, in accordance with some implementations.

FIG. 3A—Example Process for Initiating Housekeeping

FIG. 3A shows is an example process 300 for initiating housekeeping in a deduplication storage system, in accordance with some implementations. In some examples, the process 300 may be performed using the storage controller 110 (shown in FIG. 1). The process 300 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. In some implementations, the process 300 may be executed by a single processing thread. In other implementations, the process 300 may be executed by multiple processing threads in parallel (e.g., concurrently using the work map and executing multiple housekeeping jobs).

As shown in FIG. 3A, block 310 may include monitoring events in a deduplication storage system. Decision block 312 may include determining whether data is being ingested by a deduplication storage system. If not ("NO"), the process 300 may continue at decision block 316 (described below). Otherwise, if it is determined at decision block 312 that data is being ingested by the deduplication storage system ("YES"), the process 300 may continue at block 314, including performing inline housekeeping during the data ingest. Some example expansions of block 314 (i.e., example processes for performing inline housekeeping) are described below with reference to FIGS. 3B-3C and 4A-4D.

Decision block 316 may include determining whether a housekeeping job has been scheduled in the deduplication storage system. If not ("NO"), the process 300 may return to block 310 (i.e., to continue monitoring events in the deduplication storage system). Otherwise, if it is determined at decision block 316 that a housekeeping job has been scheduled in the deduplication storage system ("YES"), the process 300 may continue at block 318, including performing the scheduled housekeeping job. An example expansion of block 318 (i.e., an example process for performing a scheduled housekeeping job) is described below with reference to FIGS. 3D and 4E. After block 318, the process 300 may return to block 310 (i.e., to continue monitoring events in the deduplication storage system).

In some implementations, performing inline housekeeping during data ingest (e.g., at block 314) may complete some or all of the housekeeping work required for the deduplication storage system. Accordingly, in such implementations, the amount of housekeeping work to be performed by scheduled housekeeping jobs (e.g., at block 318) may be eliminated or reduced (e.g., in comparison to implementations that lack inline housekeeping). For example, the scheduled housekeeping jobs may only be needed to perform housekeeping for a subset of data units indexed by container indexes that are no longer used during data ingest (e.g., for matching operations against received data units). As such, some implementations may reduce the amount of I/O bandwidth used for performing housekeeping work, and may thereby improve the performance of the deduplication storage system.

FIGS. 3B and 4A-4C—Example Process for Inline Housekeeping

Figure 3B:
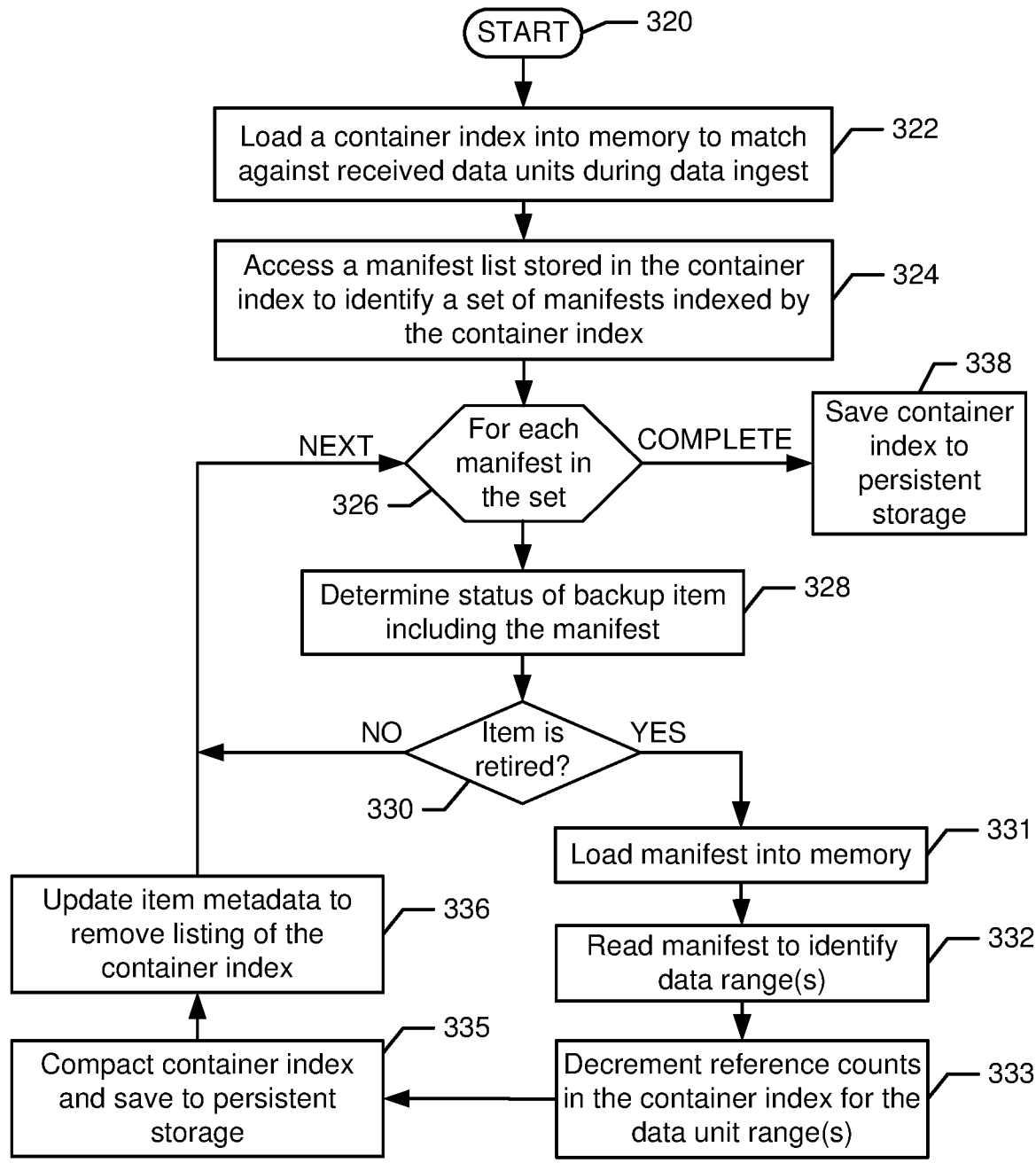

FIG. 3B shows is an example process 320 for inline housekeeping, in accordance with some implementations. The process 320 may illustrate a first example expansion of block 314 (shown in FIG. 3A). Accordingly, in some implementations, the process 320 may be performed after a determination that data is being ingested by the deduplication storage system (e.g., the "YES" output from decision block 312 shown in FIG. 3A).

For the sake of illustration, details of the process 320 may be described below with reference to the example implementations illustrated in FIGS. 1 and 4A-4C. However, other implementations are also possible. In some examples, the process 320 may be performed using the storage controller 110 (shown in FIG. 1). The process 320 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. In some implementations, the process 320 may be executed by a single processing thread. In other implementations, the process 320 may be executed by multiple processing threads in parallel.

As shown in FIG. 3A, block 322 may include loading a container index into memory to match against received data units during a data ingest operation. Block 324 may include accessing a manifest list stored in the container index to identify a set of manifests indexed by the container index. For example, referring to FIGS. 1 and 4A-4B, the storage controller 110 initiates a data ingest session to process an inbound data stream 105. The storage controller 110 transfers a copy of a container index 160 from the persistent storage 140 to the memory 115 (e.g., via a read I/O operation) for a matching operation against the fingerprints of the received data units. Upon completion of this transfer, the storage controller 110 reads the manifest list 445 (stored in the container index 160) to identify a set of manifests that are indexed by the container index 160.

Referring again to FIG. 3B, at block 326, a loop (defined by blocks 326-336) may be entered to process each of the set of manifests identified by the manifest list in the container index. Block 328 may include determining the status of the backup item that includes the current manifest (i.e., the manifest being processed in the current loop iteration). Decision block 330 may include determining whether the backup item has a retired status. If not ("NO"), the process 320 may return to block 326 (i.e., to process another manifest identified by the manifest list in the container index). For example, referring to FIG. 4B, the storage controller identifies the backup items that include the set of manifests listed in the manifest list 445 (e.g., by parsing the identifier of a manifest to extract the identifier of the backup item that includes that manifest). The storage controller then compares the identified backup items to the item catalog 450, and determines that the manifest "K-7" is included in backup item "K" that has a "Retired" status in the item catalog 450 (e.g., has been marked for deletion). In some examples, the item catalog 450 is a data structure that lists the backup items stored in a deduplication storage system (e.g., storage system 100 shown in FIG. 1) and the current status of each backup item (e.g., active, retired, and so forth).

Referring again to FIG. 3B, if it is determined at decision block 330 that the backup item that includes the current manifest has a retired status ("YES"), the process 320 may continue at block 331, including loading the current manifest into memory. Block 332 may include reading the loaded manifest to identify data range(s) to be decremented. Block 333 may include decrementing the reference counts in the container index for the identified data unit range(s). For example, referring to FIGS. 4B-4C, the storage controller loads a copy of the manifest "K-7" from the persistent storage 140 to the memory 115 (e.g., via a read I/O operation). The storage controller reads the loaded manifest "K-7" to identify one or more data unit ranges to be decremented. The storage controller decrements the reference counts for the identified data unit ranges (in the data unit metadata 442 of the container index 160). Further, the storage controller removes the entry for manifest "K-7" from the manifest list 445.

Referring again to FIG. 3B, block 335 may include compacting the container index and saving the container index to persistent storage. For example, referring to FIGS. 2 and 4A, the storage controller determines whether any of the reference counts in the container index 160 have been decremented to a zero value. If so, the storage controller attempts to obtain exclusive access to the container index 160 (e.g., if there are no matching operations to be performed using the container index 160). Upon obtaining exclusive access to the container index 160, the storage controller compacts the container index 160, and then saves the container index 160 to persistent storage 140.

Referring again to FIG. 3B, block 336 may include updating the item metadata to remove the listing of the container index. For example, referring to FIGS. 2 and 4A, the storage controller deletes an identifier of the container index 160 from the container list 204 associated with the current manifest 203 (i.e., the manifest being processed in the current loop iteration). Accordingly, the item metadata 202 is updated such that the container list 204 no longer identifies the container index 160 as indexing the data units included in the current manifest 203. Further, if each container list 204 in the item metadata 202 is empty, the item metadata 202 may be deleted.

In some implementations, the item metadata 202 may be saved to persistent storage 140 when the data ingest session is completed. If the changes to the item metadata 202 are lost before the item metadata 202 is written to persistent storage 140 (e.g., due to a power failure, system error, etc.), the item metadata 202 in persistent storage 140 may include erroneous information. For example, after recovering from a power failure, the container list 204 for manifest "K-7" (in the item metadata 202) may still list the container index 160. However, the manifest list 445 in the container index 160 may no longer list the manifest "K-7." Upon identifying this discrepancy, the storage controller may determine that no relation currently exists between manifest "K-7" and the container index 160, and may then delete the identifier of container index 160 from the container list 204.

Referring again to FIG. 3B, after block 336, the process 320 may return to block 326 (i.e., to process another manifest identified by the manifest list in the container index). Further, after all iterations of the loop are completed at block 326 (e.g., all of the manifests identified in the manifest list have been processed), the process 320 may be completed.

Figure 3C:
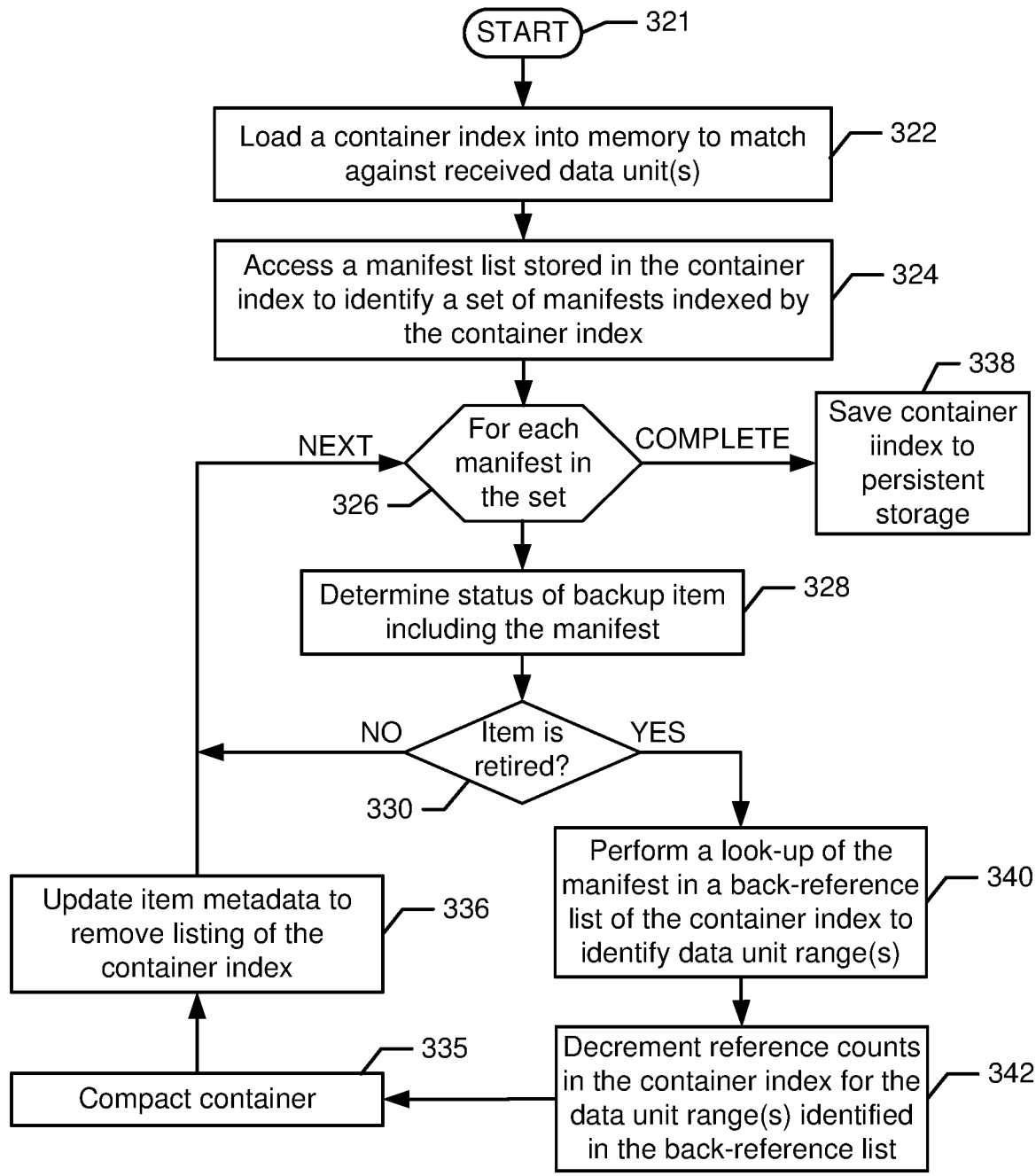
Figure 4A:
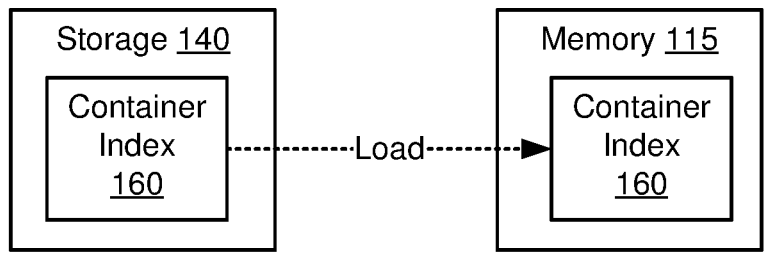
FIGS. 4A-4F are illustrations of example operations, in accordance with some implementations.
Figure 4B:
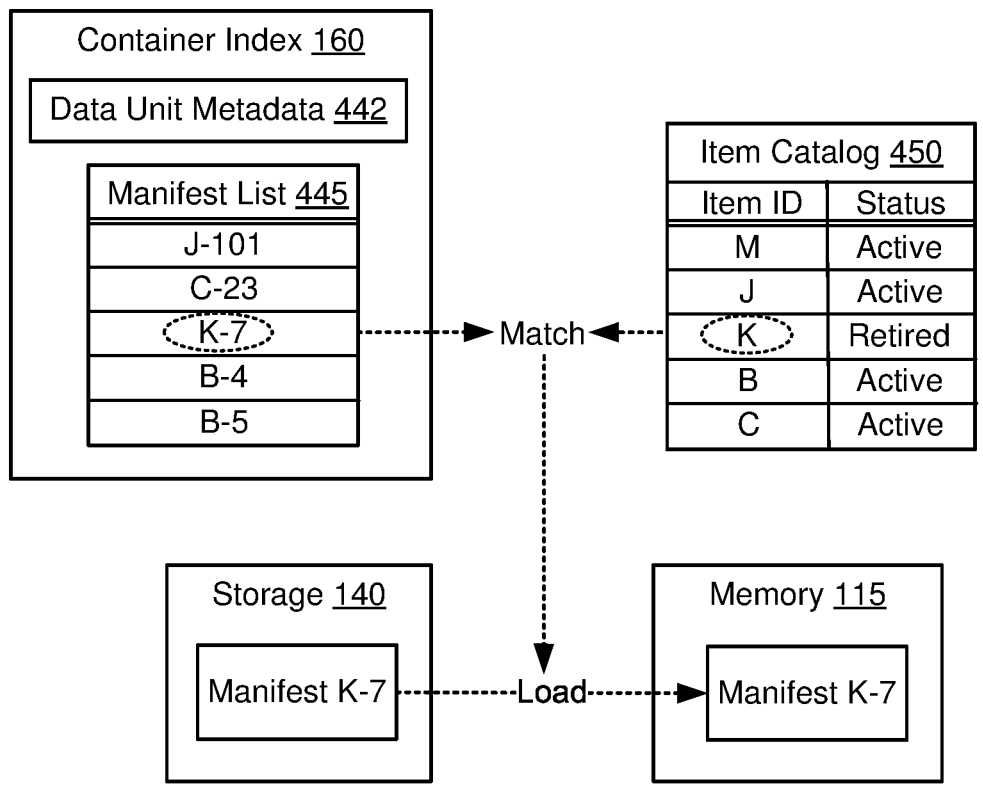
Figure 4C:
Figure 4D:
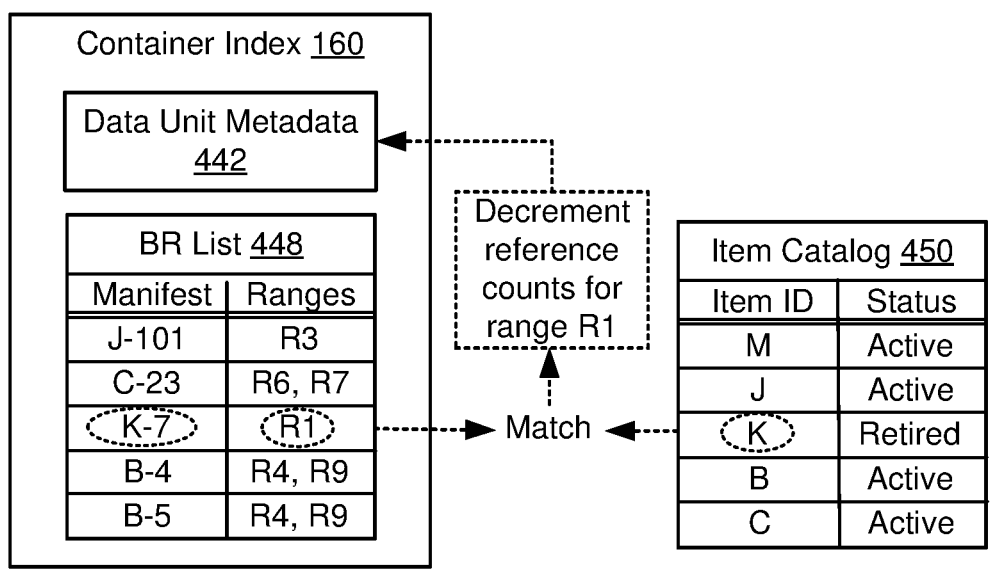

FIGS. 3C and 4D—Example Process for Inline Housekeeping

FIG. 3C shows an example process 321 for inline housekeeping using a back-reference data structure, in accordance with some implementations. The process 321 may illustrate a second example expansion of block 314 (shown in FIG. 3A). Accordingly, in some implementations, the process 321 may be performed after a determination that data is being ingested by the deduplication storage system (e.g., the "YES" output from decision block 312 shown in FIG. 3A).

For the sake of illustration, details of the process 321 may be described below with reference to the example implementations illustrated in FIGS. 1 and 4A-4D. However, other implementations are also possible. In some examples, the process 321 may be performed using the storage controller 110 (shown in FIG. 1). The process 321 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. In some implementations, the process 321 may be executed by a single processing thread. In other implementations, the process 321 may be executed by multiple processing threads in parallel.

In some implementations, the process 321 may illustrate a modified version of the process 320 (shown in FIG. 3B) in which blocks 331, 332, and 333 (of process 320) are replaced with blocks 340 and 342 (of process 321). The remaining blocks of process 321 (i.e., blocks other than 340 and 342) are described above with reference to FIG. 3B.

Block 340 may include performing a look-up of the manifest in a back-reference list of the container index to identify data unit range(s). Block 342 may include decrementing the reference counts in the container index for the data unit range(s) identified in the back-reference list.

For example, referring to FIG. 4D, the storage controller reads the back-reference ("BR") list 448 (stored in the container index 160) to identify a set of manifests that are indexed by the container index 160. The storage controller identifies the backup items that include the set of manifests listed in the back-reference list 448 (e.g., by parsing the identifier of a manifest to extract the identifier of the backup item that includes that manifest). The storage controller then compares the identified backup items to the item catalog 450, and determines that the manifest "K-7" is included in backup item "K" having a "Retired" status in the item catalog 450 (e.g., has been marked for deletion). The storage controller reads the entry for manifest "K-7" in the back-reference list 448 to identify the data unit range R1. The storage controller identifies the reference counts (in the data unit metadata 442 of container index 160) that correspond to the data units included in the data unit range R1, and then decrements the identified reference counts for the data units in the data unit range R1. In some examples, the data range information included in entries of the back-reference list 448 may be specified as a run-length reference. In such examples, the storage controller reads the run-length reference (in the back-reference entry) to identify the first data unit in the data unit range R1 (e.g., having a first arrival number "X"), and to then identify the remaining data units in the data unit range R1 (e.g., having the N arrival numbers that consecutively follow the first arrival number "X"). In this manner, the storage controller uses the run-length reference in the back-reference entry to identify all data units in the data unit range R1, and then decrements the reference counts (in the data unit metadata 442 of container index 160) that correspond to the identified data units in the data unit range R1. Accordingly, the back-reference list 448 in the container index 160 may be used to decrement the appropriate reference counts for the housekeeping job, but without having to load the manifest "K-7" into memory to identify the data units associated with those reference counts.

Figure 3D:
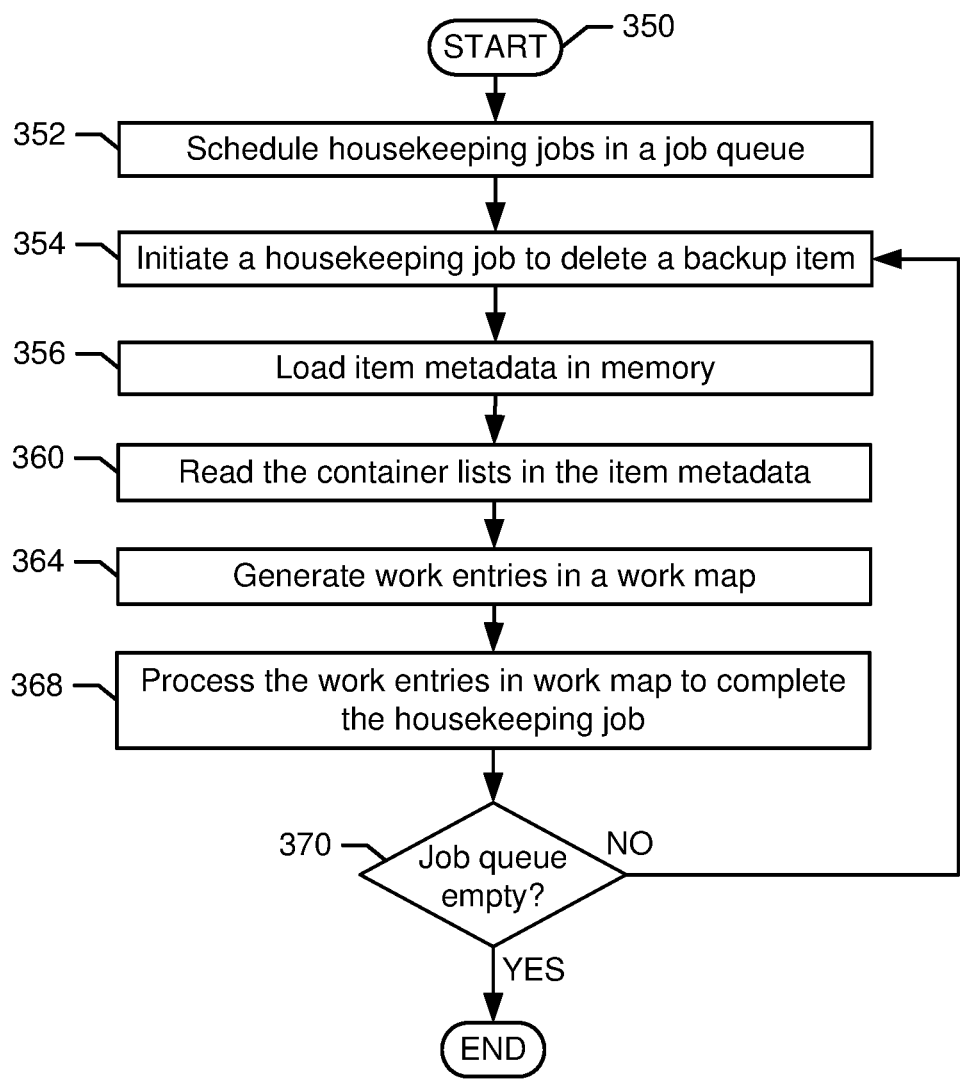
Figure 4E:
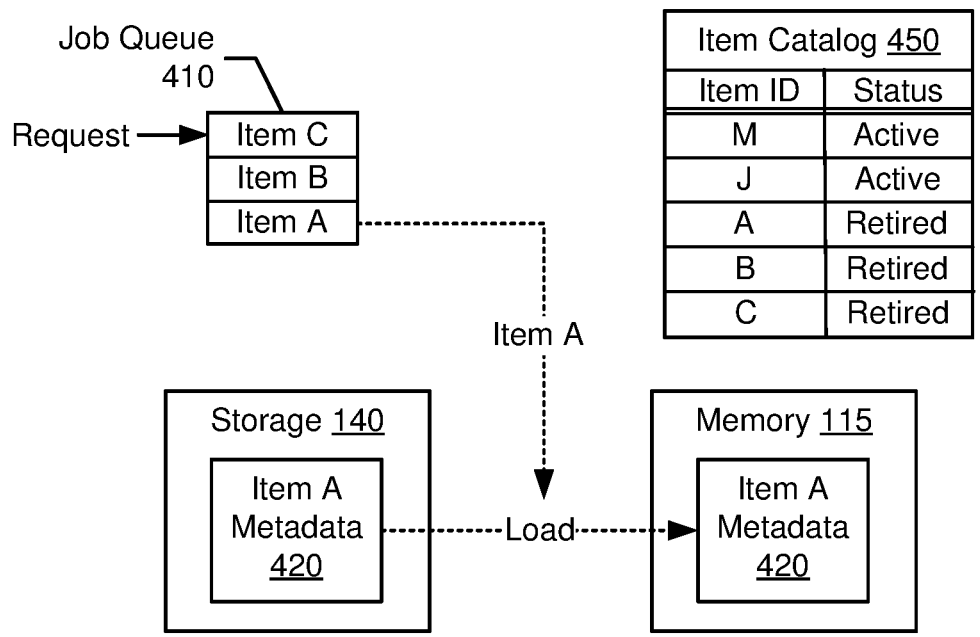
Figure 4F:
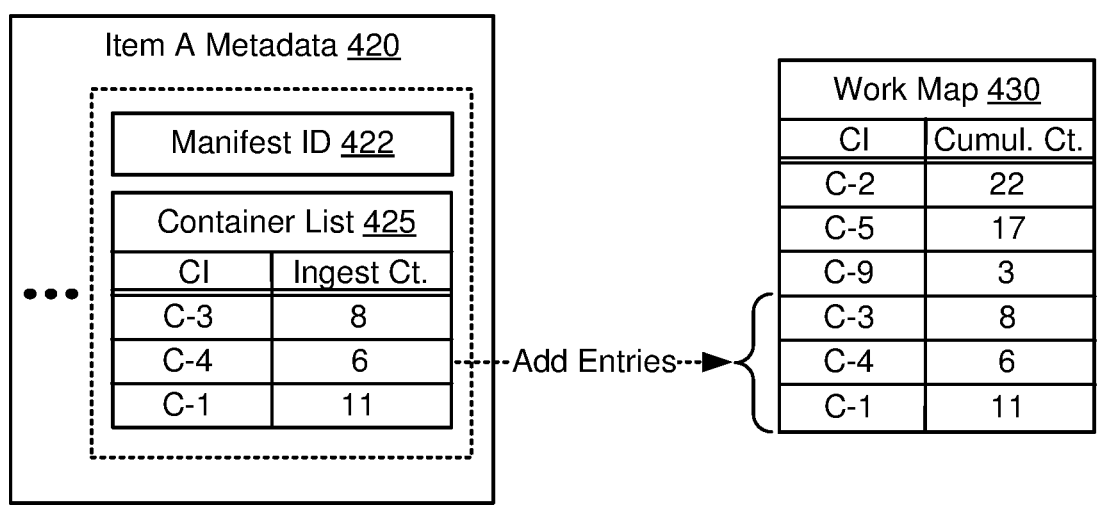

FIGS. 3D and 4E-4F—Example Process to Perform a Scheduled Housekeeping Job

FIG. 3D shows is an example process 350 to perform a scheduled housekeeping job, in accordance with some implementations. The process 350 may illustrate an example expansion of block 318 (shown in FIG. 3A). Accordingly, in some implementations, the process 350 may be performed after a determination that a housekeeping job has been scheduled in the deduplication storage system (e.g., the "YES" output from decision block 316 shown in FIG. 3A).

In some examples, the process 350 may be performed using the storage controller 110 (shown in FIG. 1). The process 350 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. In some implementations, the process 350 may be executed by a single processing thread. In other implementations, the process 350 may be executed by multiple processing threads in parallel.

As shown in FIG. 3D, block 352 may include scheduling housekeeping jobs in a job queue. For example, referring to FIG. 4E, the job queue 410 is a data structure to queue requests to delete backup items. In response to the received requests, the storage controller schedules multiple housekeeping jobs in a job queue 410 to delete the backup items A-C. Further, the storage controller updates the item catalog 450 to indicate that backup items A-C have a "retired" status (e.g., are pending deletion in a housekeeping job).

Referring again to FIG. 3D, block 354 may include initiating a housekeeping job to delete a backup item stored in a deduplication storage system. Block 356 may include loading item metadata in memory. For example, referring to FIG. 4E, the storage controller selects a housekeeping job from the job queue 410, and initiates the selected job to delete backup item A. Further, the storage controller loads the item A metadata 420 (i.e., item metadata for backup item A) from the persistent storage 140 to the memory 115.

Referring again to FIG. 3D, block 360 may include reading the container lists included in the item metadata. Block 364 may include generating work entries in a work map. For example, referring to FIG. 4F, the storage controller reads item A metadata 420 including multiple manifest identifiers 422 and multiple container lists 425, where each container list 425 is associated with a different manifest identifier 422. Each container list 425 includes a different entry (also referred to as a "CI entry") for each container index 160 that indexes data units included in the manifest 150 identified by the associated manifest identifier 422. Further, each container list 425 includes, for each listed container index 160, an ingest count value ("Ingest Count") indicating the number of data units that were newly added (i.e., not matched) to the container index 160 from the manifest 150 at the time that the identifier of the container index 160 was added to the container list 425. The storage controller uses the CI entries in the container list 425 to add new work entries to the work map 430.

Referring again to FIG. 3D, block 368 may include processing the work entries in the work map to complete the housekeeping job. For example, a storage controller selects a work entry for a container index (e.g., C-2) from a work map, and causes the container index to be loaded from the persistent storage into memory. The storage controller reads a manifest list in the container index to identify a subset of manifests that match backup items with retired status. The storage controller causes the subset of manifests (i.e., the manifests in the manifest list that match the backup items with retired status) to be loaded from persistent storage into memory. The storage controller reads the subset of manifests, and identifies one or more data unit ranges to be decremented. The storage controller decrements the reference counts for the identified data unit ranges in the container index.

Referring again to FIG. 3D, decision block 370 may include determining whether the job queue is empty (e.g., no housekeeping jobs remain scheduled for performance). If not ("NO"), the process 350 may return to block 354 (i.e., to initiate another housekeeping job that is scheduled in the job queue). Otherwise, if it is determined at decision block 370 that the job queue is empty ("YES"), the process 350 may be completed.

Figure 5:
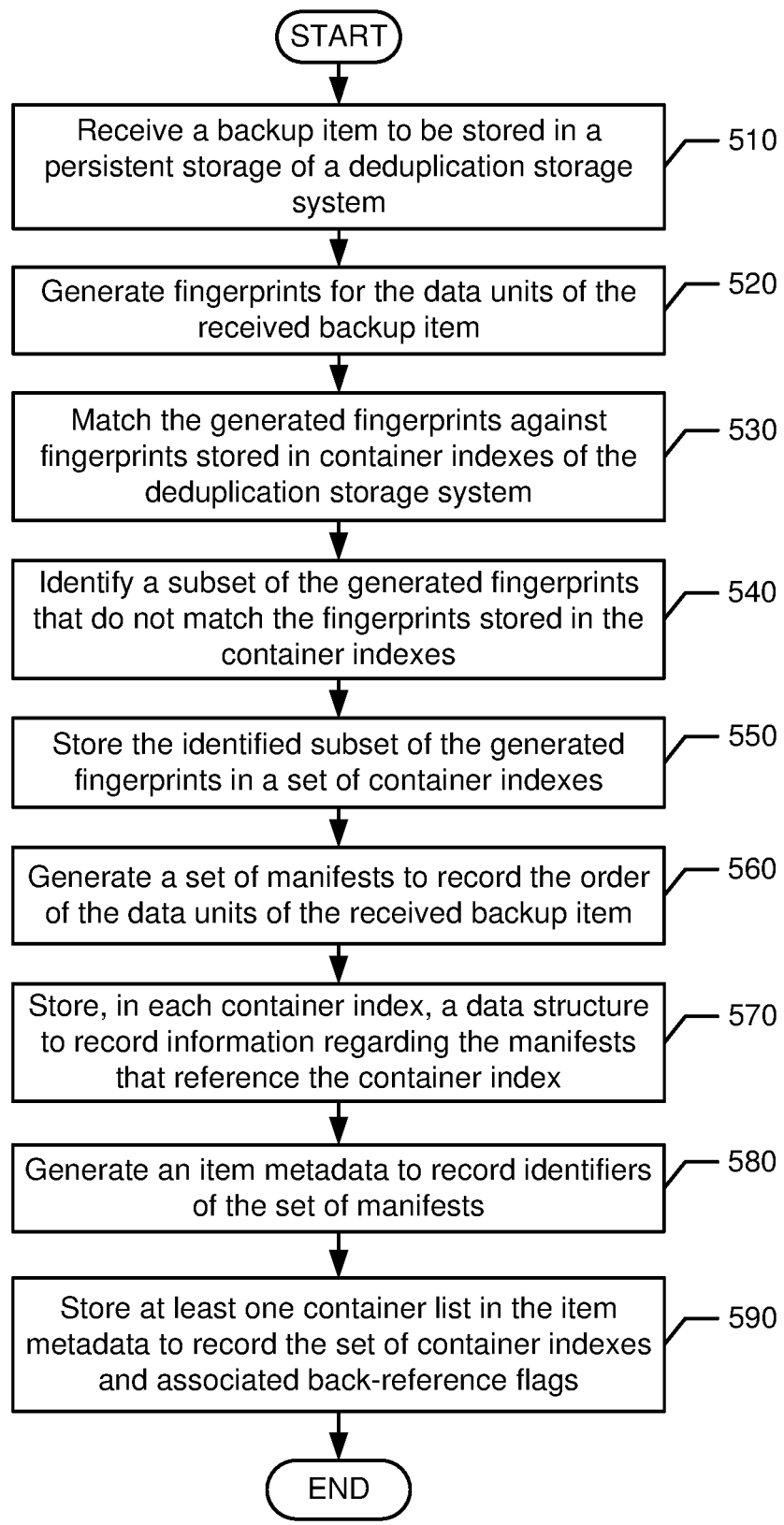
FIG. 5 is an illustration of an example process, in accordance with some implementations.

FIG. 5—Example Process for Generating Metadata

FIG. 5 shows is an example process 500 for generating metadata, in accordance with some implementations. For the sake of illustration, details of the process 500 may be described below with reference to FIGS. 1 and 4A-4F, which show examples in accordance with some implementations. However, other implementations are also possible. In some examples, the process 500 may be performed using the storage controller 110 (shown in FIG. 1). The process 500 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 510 may include receiving a backup item to be stored in a persistent storage of a deduplication storage system. Block 520 may include generating fingerprints for the data units of the received backup item. For example, referring to FIG. 1, the storage controller 110 receives a backup item (e.g., data stream 105) to be stored in the deduplication storage system 100, and generates fingerprints for the data units in the received backup item.

Block 530 may include matching the generated fingerprints against fingerprints stored in container indexes of the deduplication storage system. Block 540 may include identifying a subset of the generated fingerprints that do not match the fingerprints stored in the container indexes. Block 550 may include storing the identified subset of the generated fingerprints in a set of container indexes. For example, referring to FIG. 1, the storage controller 110 compares the generated fingerprints to the fingerprints included in container indexes 160. If a match is identified for a data unit, then the storage controller 110 determines that a duplicate of the data unit is already stored by the storage system 100. In response to this determination, the storage controller 110 stores a reference to the previous data unit (e.g., in a manifest 150) in deduplicated form. Otherwise, if a match is not identified for a data unit, then the storage controller 110 stores the data unit is a data container 170, and adds an entry for the data unit to a container index 160 corresponding to that data container 170.

Block 560 may include generating a set of manifests to record the order of the data units of the received backup item. Block 570 may include storing, in each container index, a back-reference list to record the manifests and data unit ranges that reference the container index. For example, referring to FIGS. 1 and 4D, the storage controller 110 records the order in which data units are received in one or more manifests 150. Further, the storage controller 110 generates the back-reference list 448 in the container index 160. The back-reference list 448 identifies each manifest 150 (e.g., "K-7") that currently references the container index 160. Further, the back-reference list 448 may also identify, for each identified manifest 150, at least one data unit range representing the set of data units that are included in the manifest 150 and that are indexed by the container index 160.

Block 580 may include generating an item metadata to record identifiers of the set of manifests. Block 590 may include storing at least one container list in the item metadata to record the set of container indexes and associated back-reference flags. After block 590, the process 500 may be completed. For example, referring to FIGS. 1 and 4D-4F, the storage controller 110 generates item A metadata 420 to represent backup item A. The item A metadata 420 includes multiple manifest identifiers 422 and multiple container lists 425, where each container list 425 is associated with a different manifest identifier 422. Each container list 425 includes a set of CI entries. Each CI entry includes a CI identifier for each container index 160 that indexes data units included in the manifest 150 identified by the associated manifest identifier 422. Further, each CI entry may include a back-reference flag (not shown) to indicate whether the manifest-CI combination (represented by the CI entry) is to be processed using the back-reference list 448 included in the container index 160.

Figure 6:
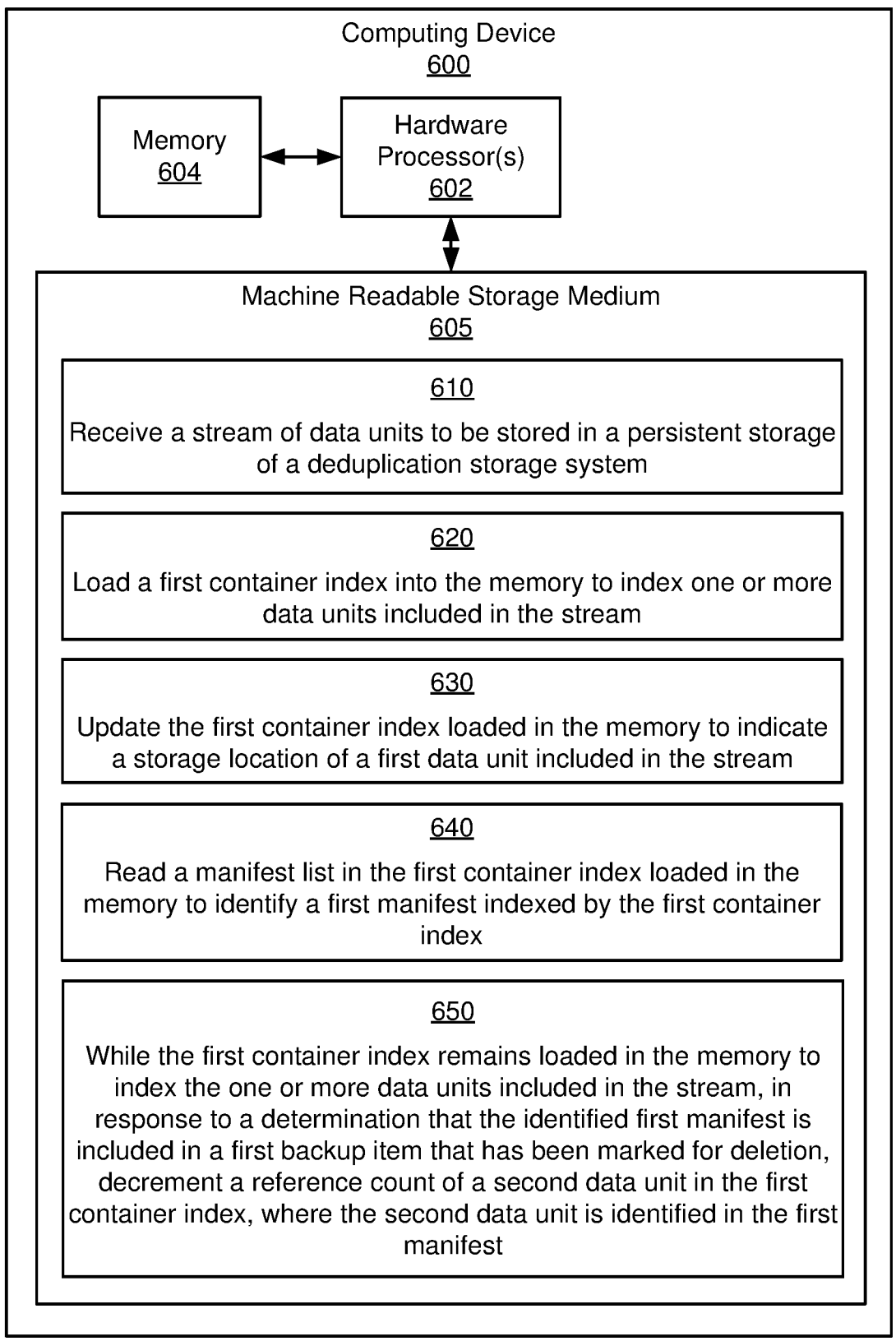
FIG. 6 is a schematic diagram of an example computing device, in accordance with some implementations.

FIG. 6—Example Computing Device

FIG. 6 shows a schematic diagram of an example computing device 600. In some examples, the computing device 600 may correspond generally to some or all of the storage system 100 (shown in FIG. 1). As shown, the computing device 600 may include a hardware processor 602, a memory 604, and machine-readable storage 605 including instructions 610-650. The machine-readable storage 605 may be a non-transitory medium. The instructions 610-650 may be executed by the hardware processor 602, or by a processing engine included in hardware processor 602.

Instruction 610 may be executed to receive a stream of data units to be stored in a persistent storage of a deduplication storage system. For example, referring to FIGS. 1 and 4A-4B, the storage controller 110 receives a backup item (e.g., data stream 105) to be stored in the deduplication storage system 100, and generates fingerprints for the data units in the received backup item.

Instruction 620 may be executed to load a first container index into the memory to index one or more data units included in the stream. Instruction 630 may be executed to update the first container index loaded in the memory to indicate a storage location of a first data unit included in the stream. For example, referring to FIGS. 1 and 4A-4B, the storage controller 110 transfers a copy of a container index 160 from the persistent storage 140 to the memory 115 (e.g., via a read I/O operation), and performs a matching operation to compare the fingerprints of the received data units to fingerprints included in the container index 160. The storage controller 110 identifies a first data unit having a fingerprint that is not matched to the fingerprints in the container index 160, and in response causes a copy of the first data unit to be stored in a data container 170. Further, the storage controller 110 updates the container index 160 to indicate a storage location of the first data unit in the data container 170.

Instruction 640 may be executed to read a manifest list in the first container index loaded in the memory to identify a first manifest indexed by the first container index. For example, referring to FIGS. 1 and 4A-4B, upon transferring the container index 160 from the persistent storage 140 to the memory 115 to perform the matching operation, the storage controller 110 reads the manifest list 445 (stored in the container index 160) to identify a set of manifests that are indexed by the container index 160.

Instruction 650 may be executed to, while the first container index remains loaded in the memory to index the one or more data units included in the stream, in response to a determination that the identified first manifest is included in a first backup item that has been marked for deletion, decrement a reference count of a second data unit in the first container index, where the second data unit is identified in the first manifest. For example, referring to FIGS. 4A-4C, while the container index 160 remains loaded in the memory 115 for the matching operation, the storage controller identifies the backup items that include the set of manifests listed in the manifest list 445 (e.g., by parsing the identifier of a manifest to extract the identifier of the backup item that includes that manifest). The storage controller then compares the identified backup items to the item catalog 450, and determines that the manifest "K-7" is included in backup item "K" that has a "Retired" status in the item catalog 450 (e.g., has been marked for deletion). The storage controller then loads a copy of the manifest "K-7" from the persistent storage 140 to the memory 115 (e.g., via a read I/O operation), and reads the loaded manifest "K-7" to identify one or more data unit ranges to be decremented. Further, the storage controller decrements the reference counts for the identified data unit ranges (in the data unit metadata 442 of the container index 160).

In another example, referring to FIGS. 4A and 4D, while the container index 160 remains loaded in the memory 115 for the matching operation, the storage controller reads the back-reference list 448 (in the container index 160) to identify a set of manifests that are indexed by the container index 160. The storage controller identifies the backup items that include the set of manifests listed in the back-reference list 448. The storage controller compares the identified backup items to the item catalog 450, and determines that the manifest "K-7" is included in backup item "K" that has a "Retired" status in the item catalog 450. The storage controller reads the entry for manifest "K-7" in the back-reference list 448 to identify the data unit range R1. The storage controller identifies the reference counts (in the data unit metadata 442 of container index 160) that correspond to the data units included in the data unit range R1, and then decrements the identified reference counts for the data units in the data unit range R1.

Figure 7:
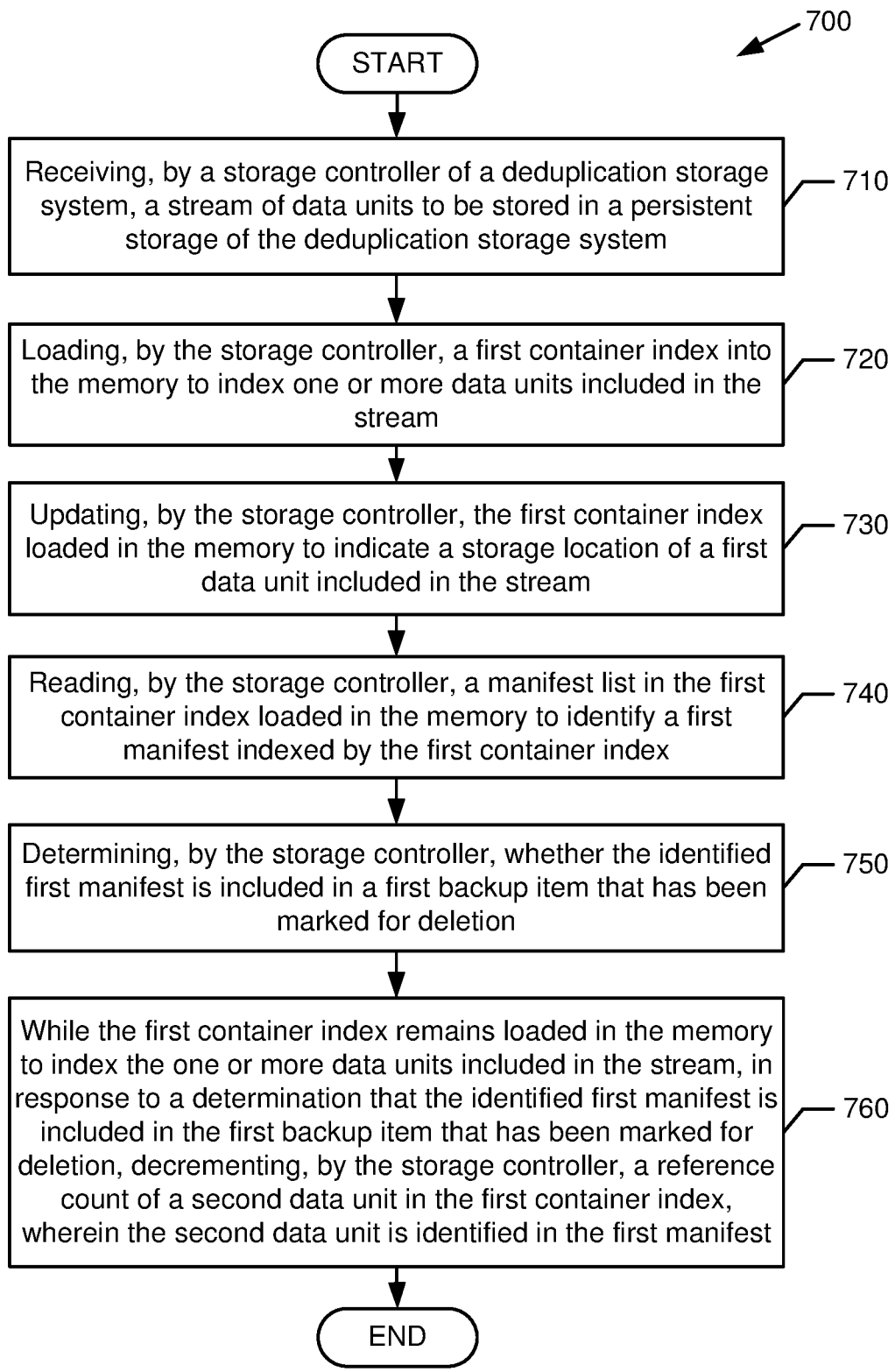
FIG. 7 is an illustration of an example process, in accordance with some implementations.

FIG. 7—Example Process for Inline Housekeeping

FIG. 7 shows is an example process 700 for inline housekeeping, in accordance with some implementations. In some examples, the process 700 may be performed using the storage controller 110 (shown in FIG. 1). The process 700 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 710 may include receiving, by a storage controller of a deduplication storage system, a stream of data units to be stored in a persistent storage of the deduplication storage system. Block 720 may include loading, by the storage controller, a first container index into the memory to index one or more data units included in the stream.

Block 730 may include updating, by the storage controller, the first container index loaded in the memory to indicate a storage location of a first data unit included in the stream. Block 740 may include reading, by the storage controller, a manifest list in the first container index loaded in the memory to identify a first manifest indexed by the first container index.

Block 750 may include determining, by the storage controller, whether the identified first manifest is included in a first backup item that has been marked for deletion. Block 760 may include, while the first container index remains loaded in the memory to index the one or more data units included in the stream, in response to a determination that the identified first manifest is included in the first backup item that has been marked for deletion, decrementing, by the storage controller, a reference count of a second data unit in the first container index, where the second data unit is identified in the first manifest.

Figure 8:
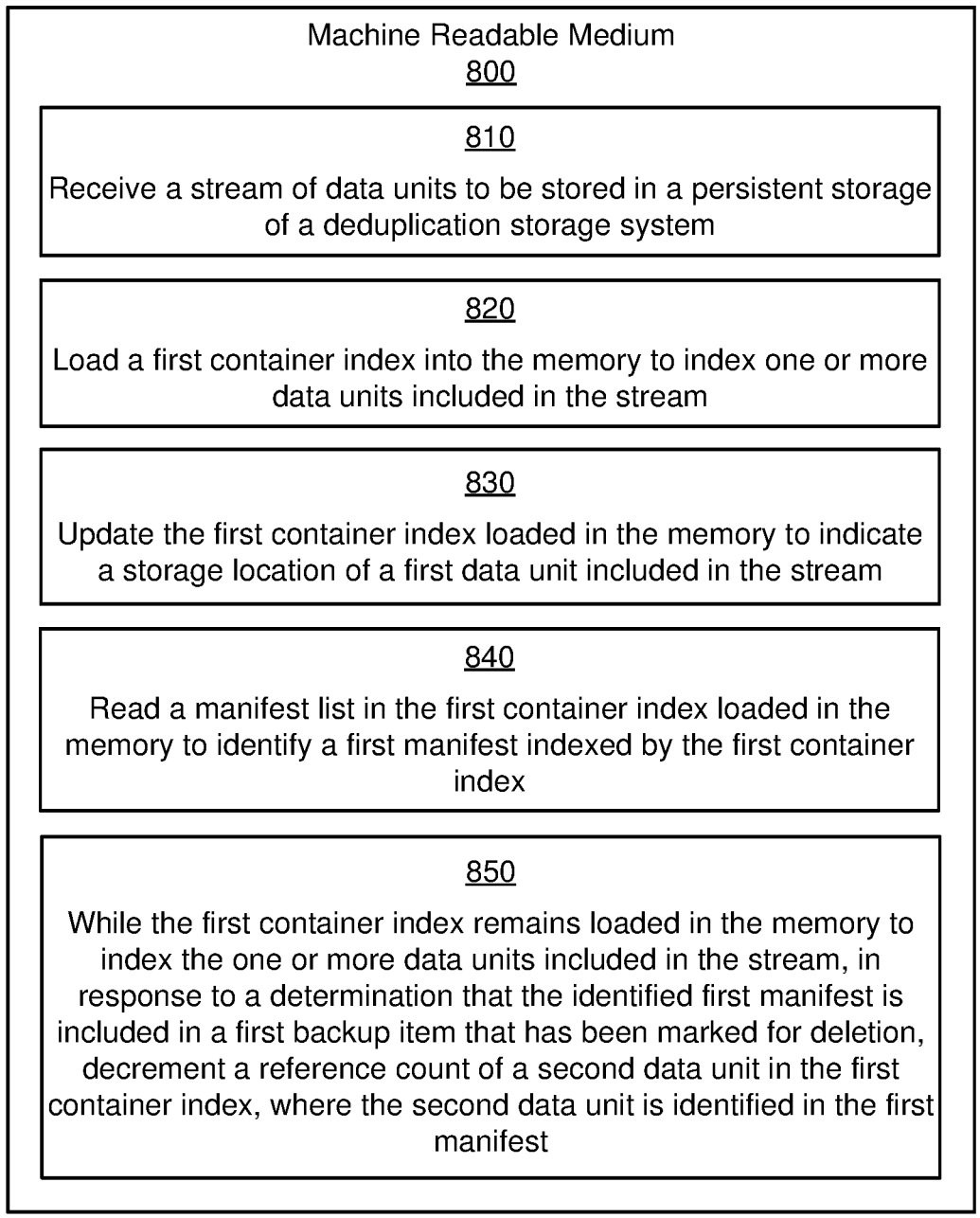
FIG. 8 is a diagram of an example machine-readable medium storing instructions in accordance with some implementations.

FIG. 8—Example Machine-Readable Medium

FIG. 8 shows a machine-readable medium 800 storing instructions 810-850, in accordance with some implementations. The instructions 810-850 can be executed by a single processor, multiple processors, a single processing engine, multiple processing engines, and so forth. The machine-readable medium 500 may be a non-transitory storage medium, such as an optical, semiconductor, or magnetic storage medium.

Instruction 810 may be executed to receive a stream of data units to be stored in a persistent storage of a deduplication storage system. Instruction 820 may be executed to load a first container index into the memory to index one or more data units included in the stream. Instruction 830 may be executed to update the first container index loaded in the memory to indicate a storage location of a first data unit included in the stream.

Instruction 840 may be executed to read a manifest list in the first container index loaded in the memory to identify a first manifest indexed by the first container index. Instruction 850 may be executed to, while the first container index remains loaded in the memory to index the one or more data units included in the stream, in response to a determination that the identified first manifest is included in a first backup item that has been marked for deletion, decrement a reference count of a second data unit in the first container index, where the second data unit is identified in the first manifest.

In accordance with some implementations of the present disclosure, a controller of a deduplication storage system may perform inline housekeeping during a data ingest process. In some examples, when a container index is loaded into memory during the data ingest process, the controller may access a data structure in the container index to identify manifests that are indexed by the container index. The controller may identify each backup item that includes at least one of the manifests indexed by the container index, and may determine whether the backup item has been marked for deletion. If so, the controller may perform an inline housekeeping process to decrement the reference counts in the container index that represent data units included in the marked backup item. Accordingly, because the inline housekeeping for the marked backup item is performed while the container index is already loaded in memory, there is no need for a separate I/O operation to load the container index into memory to perform housekeeping for the marked backup item. In this manner, some implementations may reduce the amount of I/O bandwidth used for housekeeping jobs, and may thereby improve the performance of the storage system.

Note that, while FIGS. 1-8 show various examples, implementations are not limited in this regard. For example, referring to FIG. 1, it is contemplated that the storage system 100 may include additional devices and/or components, fewer components, different components, different arrangements, and so forth. In another example, it is contemplated that the functionality of the storage controller 110 described above may be included in any another engine or software of storage system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing device comprising:
   a processor;
   a memory; and
   a machine-readable storage storing instructions, the instructions executable by the processor to:
   receive a stream of data units to be stored in a persistent storage of a deduplication storage system;
   load a first container index into the memory to perform a data ingest of a set of received data units included in the stream, wherein the first container index remains loaded in the memory during the data ingest to deduplicate the set of received data units;
   update, during the data ingest of the set of received data units, the first container index loaded in the memory to indicate a storage location of a first data unit included in the set of received data units;
   read, during the data ingest of the set of received data units, a manifest list in the first container index loaded in the memory to identify a first manifest indexed by the first container index;

determine, during the data ingest of the set of received data units, whether the identified first manifest is included in a first backup item that has been marked for deletion; and in response to a determination that the identified first manifest is included in the first backup item that has been marked for deletion, during the data ingest of the set of received data units, decrement, in the first container index loaded in the memory, a reference count of a second data unit that is identified in the first manifest.

2. The computing device of claim 1, including instructions executable by the processor to:

during the data ingest of the set of received data units, in response to the determination that the identified first manifest is included in the first backup item that has been marked for deletion:

load the first manifest into the memory;

read the loaded first manifest to identify one or more data unit ranges to be decremented; and decrement, in the first container index, the reference counts for the identified one or more data unit ranges.

3. The computing device of claim 1, including instructions executable by the processor to:

during the data ingest of the set of received data units, in response to the determination that the identified first manifest is included in the first backup item that has been marked for deletion:

read, in the manifest list of the container index, an entry for the first manifest to identify one or more data unit ranges to be decremented; and decrement, in the first container index, the reference counts for the identified one or more data unit ranges.

4. The computing device of claim 1, including instructions executable by the processor to:

in response to a determination that a housekeeping job has been scheduled in a job queue, perform the scheduled housekeeping job in the deduplication storage system.

5. The computing device of claim 1, including instructions executable by the processor to:

access the manifest list in the first container index to identify a set of manifests indexed by the first container index, wherein the first container index includes at least a first portion and a second portion, wherein the first portion stores data unit metadata, wherein the second portion stores the manifest list, wherein the manifest list includes one or more manifest list entries, and wherein each manifest list entry stores a manifest identifier for a different manifest of the deduplication storage system;

determine a set of backup items that include the identified set of manifests; and determine, based on an item catalog, a current status for each of the set of backup items.

6. The computing device of claim 1, including instructions executable by the processor to, after decrementing the reference count of the second data unit in the first container index:

compact the first container index; and save the first container index to the persistent storage.

7. The computing device of claim 1, including instructions executable by the processor to, after decrementing the reference count of the second data unit in the first container index:

update item metadata for the first backup item to remove a listing of the first container index; and in response to a determination that a data ingest session for the stream of data units has completed, save the updated item metadata to persistent storage.

8. A method comprising:

receiving, by a storage controller of a deduplication storage system, a stream of data units to be stored in a persistent storage of the deduplication storage system;

loading, by the storage controller, a first container index into the memory to perform a data ingest of a set of received data units included in the stream, wherein the first container index remains loaded in the memory during the data ingest to deduplicate the set of received data units;

during the data ingest of the set of received data units, updating, by the storage controller, the first container index loaded in the memory to indicate a storage location of a first data unit included in the set of received data units;

during the data ingest of the set of received data units, reading, by the storage controller, a manifest list in the first container index loaded in the memory to identify a first manifest indexed by the first container index;

during the data ingest of the set of received data units, determining, by the storage controller, whether the identified first manifest is included in a first backup item that has been marked for deletion; and during the data ingest of the set of received data units, in response to a determination that the identified first manifest is included in the first backup item that has been marked for deletion, decrementing, by the storage controller, a reference count of a second data unit in the first container index loaded in the memory, wherein the second data unit is identified in the first manifest.

9. The method of claim 8, comprising:

during the data ingest of the set of received data units, in response to the determination that the identified first manifest is included in the first backup item that has been marked for deletion:

loading the first manifest into the memory;

reading the loaded first manifest to identify one or more data unit ranges to be decremented; and decrementing, in the first container index, the reference counts for the identified one or more data unit ranges.

10. The method of claim 8, comprising:

during the data ingest of the set of received data units, in response to the determination that the identified first manifest is included in the first backup item that has been marked for deletion:

reading, in the manifest list of the container index, an entry for the first manifest to identify one or more data unit ranges to be decremented; and decrementing, in the first container index, the reference counts for the identified one or more data unit ranges.

11. The method of claim 8, comprising:

in response to a determination that a housekeeping job has been scheduled in a job queue, perform the scheduled housekeeping job in the deduplication storage system.

12. The method of claim 8, comprising:

accessing the manifest list in the first container index to identify a set of manifests indexed by the first container index, wherein the first container index includes at least a first portion and a second portion, wherein the first portion stores data unit metadata, wherein the second portion stores the manifest list, wherein the manifest list includes one or more manifest list entries, and wherein each manifest list entry stores a manifest identifier for a different manifest of the deduplication storage system;

determining a set of backup items that include the identified set of manifests; and determining, based on an item catalog, a current status for each of the set of backup items.

13. The method of claim 8, comprising, after decrementing the reference count of the second data unit in the first container index:

compacting the first container index; and saving the first container index to the persistent storage.

14. The method of claim 8, comprising, after decrementing the reference count of the second data unit in the first container index:

updating item metadata for the first backup item to remove a listing of the first container index;

determining whether a data ingest session for the stream of data units has completed; and in response to a determination that the data ingest session for the stream of data units has completed, saving the updated item metadata to persistent storage.

15. A non-transitory machine-readable medium storing instructions that upon execution cause a processor to:

receive a stream of data units to be stored in a persistent storage of a deduplication storage system;

load a first container index into the memory to perform a data ingest of a set of received data units included in the stream, wherein the first container index remains loaded in the memory during the data ingest to deduplicate the set of received data units;

update, during the data ingest of the set of received data units, the first container index loaded in the memory to indicate a storage location of a first data unit included in the stream;

read, during the data ingest of the set of received data units, a manifest list in the first container index loaded in the memory to identify a first manifest indexed by the first container index;

determine, during the data ingest of the set of received data units, whether the identified first manifest is included in a first backup item that has been marked for deletion; and in response to a determination that the identified first manifest is included in the first backup item that has been marked for deletion, during the data ingest of the set of received data units, decrement, in the first container index loaded in the memory, a reference count of a second data unit that is identified in the first manifest.

16. The non-transitory machine-readable medium of claim 15, including instructions that upon execution cause the processor to:

during the data ingest of the set of received data units, in response to the determination that the identified first manifest is included in the first backup item that has been marked for deletion:

load the first manifest into the memory;

read the loaded first manifest to identify one or more data unit ranges to be decremented; and decrement, in the first container index, the reference counts for the identified one or more data unit ranges.

17. The non-transitory machine-readable medium of claim 15, including instructions that upon execution cause the processor to:

during the data ingest of the set of received data units, in response to the determination that the identified first manifest is included in the first backup item that has been marked for deletion:

read, in the manifest list of the container index, an entry for the first manifest to identify one or more data unit ranges to be decremented; and decrement, in the first container index, the reference counts for the identified one or more data unit ranges.

18. The non-transitory machine-readable medium of claim 15, including instructions that upon execution cause the processor to:

in response to a determination that a housekeeping job has been scheduled in a job queue, perform the scheduled housekeeping job in the deduplication storage system.

19. The non-transitory machine-readable medium of claim 15, including instructions that upon execution cause the processor to:

access the manifest list in the first container index to identify a set of manifests indexed by the first container index, wherein the first container index includes at least a first portion and a second portion, wherein the first portion stores data unit metadata, wherein the second portion stores the manifest list, wherein the manifest list includes one or more manifest list entries, and wherein each manifest list entry stores a manifest identifier for a different manifest of the deduplication storage system;

determine a set of backup items that include the identified set of manifests; and determine, based on an item catalog, a current status for each of the set of backup items.

20. The non-transitory machine-readable medium of claim 15, including instructions that upon execution cause the processor to, after decrementing the reference count of the second data unit in the first container index:

compact the first container index;

save the first container index to the persistent storage;

update item metadata for the first backup item to remove a listing of the first container index; and in response to a determination that a data ingest session for the stream of data units has completed, save the updated item metadata to persistent storage.

* * * * *